United States Patent [19]
Deffenbaugh

[11] 4,321,452
[45] Mar. 23, 1982

[54] FLASH WELDERS

[75] Inventor: James F. Deffenbaugh, Warren, Ohio

[73] Assignee: Wean United, Inc., Pittsburgh, Pa.

[21] Appl. No.: 199,557

[22] Filed: Oct. 22, 1980

[51] Int. Cl.³ ............................................. B23K 11/04
[52] U.S. Cl. ...................................... 219/100; 219/97; 219/101; 219/104
[58] Field of Search ................... 219/97, 100, 101, 104

[56] References Cited

U.S. PATENT DOCUMENTS

| | | | |
|---|---|---|---|
| 2,443,965 | 6/1948 | Seeloff | 219/97 |
| 3,542,994 | 11/1970 | Deffenbaugh et al. | 219/97 |
| 3,980,857 | 9/1976 | Sclaky | 219/97 |

*Primary Examiner*—C. C. Shaw
*Attorney, Agent, or Firm*—Michael Williams

[57] ABSTRACT

Method and apparatus for detecting whether or not the gap in adjoining ends of a ring-like workpiece to be flash welded is of normal size, or is so much larger as to produce an unsatisfactory weld. The invention provides means whereby the amount the movable platen of a flash welder moves in a direction toward the stationary platen is compared with its position when the ends abut and flashing begins. If the ends are not materially beyond a predetermined normal gap, the welding action proceeds; however, if the ends are spaced beyond such normal gap, further action of the flash welding process is aborted, or a signal is activated; or both abortion and signal are provided. The invention is especially adapted for use in welding rings which are formed and welded in high production, such as rings that are further processed to make rims for tires of a vehicle.

15 Claims, 12 Drawing Figures

SEQUENCE START

CONTROL SYSTEM OPERATION SIGNAL

ABORT CIRCUIT

FLASH WELDERS

BACKGROUND AND SUMMARY

In the high production of metal rings, such as automobile rims, a flat strip of metal is formed into circular shape with a gap between end surfaces, and such surfaces are joined by means of resistance flash welding.

Due to physical variations between one run of metal strips and another, the gaps between end surfaces of the rolled rims cannot be precisely controlled during the rim-forming operation and, because of the economics required in high production manufacturing, the gaps cannot be redimensioned or measured before the flash welding operation. In a closely-controlled operation, most rim gaps are held to acceptable tolerances but, as above noted, physical variations in the metal may cause gaps that are too large for acceptable welds.

If a rim is formed so that no gap exists between its end surfaces, such surfaces will "freeze" at the start of flashing function of the machine and no effective flashing will occur and no satisfactory weld will be made. However, a control circuit, such as disclosed in U.S. Pat. No. 3,542,994, issued to me and Richard L. Curtner in Nov. 24, 1970, and assigned to the assignee of the present invention, is effective to prevent "freezing," even if the adjoining ends of a rim are in touching relation. The difficulty occurs when a gap larger than normal is formed, and applicant is unaware of any prior art which will provide for an acceptable weld under such gap conditions.

In the manufacture of automobile rims, metal strips of predetermined length are sheared from a long length of fastmoving continuous strip. The sheared strips are rolled to rim shape at high speeds and are individually loaded into a flash welder, welded and thereafter ejected from the welder in high production manner. Thus it is impractical to measure the gap in a rolled rim and either reject or redimension the gap thereof in this high production line. Yet, the welds in the individual rims must be satisfactory or the rims will fail, either in subsequent forming operations, or in actual use.

My invention provides means whereby when a ring is loaded into a flashwelder with a gap too large to produce a suitable weld, the welding operation is either aborted, or a signal is given, or both. To obtain this desirable result, the movement of the movable platen toward the stationary platen is compared with its position when flashing actually begins. If the gap is within tolerance, the movable platen will be in the correct position at the time of welding. On the other hand, if the gap is too large, the movable platen will move beyond its position for flashing before the end surfaces of the rim abut and flashing begins, and it is this comparison of platen movement with the start of flashing that I utilize to determine whether or not conditions are proper for an acceptable weld.

DESCRIPTION OF THE DRAWINGS

In the drawings accompanying this specification and forming a part of this application, there is shown, for purpose of illustration, an embodiment which my invention may assume, and in these drawings.

DESCRIPTIONS OF THE PREFERRED EMBODIMENTS

It is believed that my invention may be best appreciated by a brief discussion of platen movement during a welding operation in a rim welding operation. As before pointed out, the gaps between adjoining ends of a rim formed by high production methods may vary for several reasons.

Figure 1A:
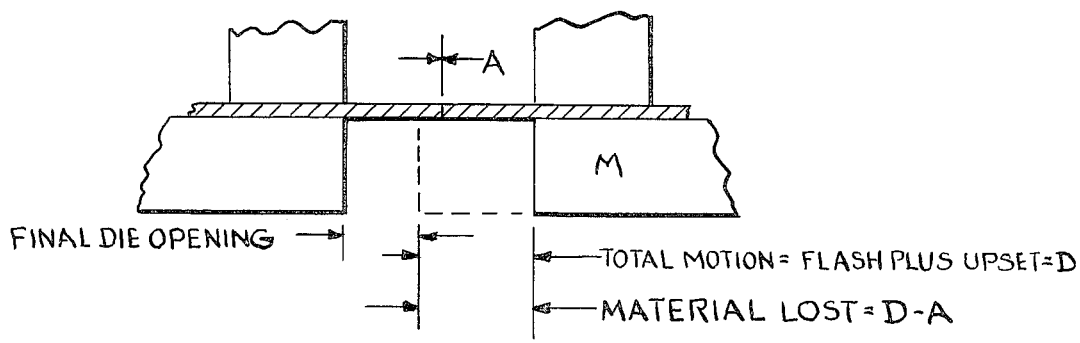
FIG. 1a, 1b and 1c are fragmentary schematic representations of the adjoining ends of a metal rim in touching, correctly gapped and too-large gapped relation, respectively.

FIG. 1a shows a condition wherein the adjoining ends touch each other, so no gap exists therebetween. Ordinarily, when electric current was caused to flow between the ends, they would "freeze" with no weld produced because little or no flashing occured. The gap control in said U.S. Pat. No. 3,542,994, solved the problem of "freezing" and therefore enough metal is burned at the rim ends to create sufficient heat to weld the ends when they are pushed together during the upset function of the welding operation.

Figure 1B:
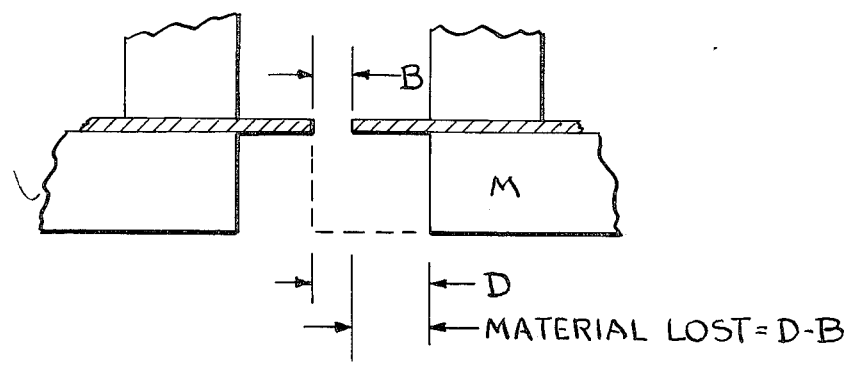

FIG. 1b shows a normal gap position wherein the adjoining ends of the rim may be brought together for flashing and upset to produce an acceptable weld.

Figure 1C:
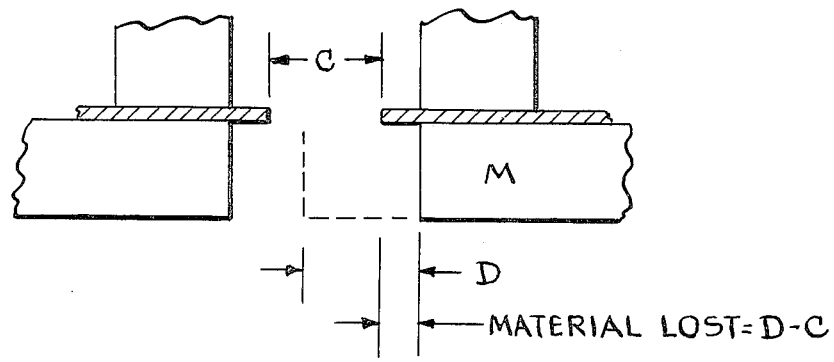

FIG. 1c shows a condition wherein a large gap exists between the adjoining ends of the rim. In most cases, the gap is not so large that the ends never abut during the entire movement of the movable platen; rather, the gap is large enough so that the rim ends touch after the movable platen has moved beyond its flashing position, so that insufficient metal is burned at the gap to thereby provide insufficient heat for a satisfactory weld.

Figure 2A:
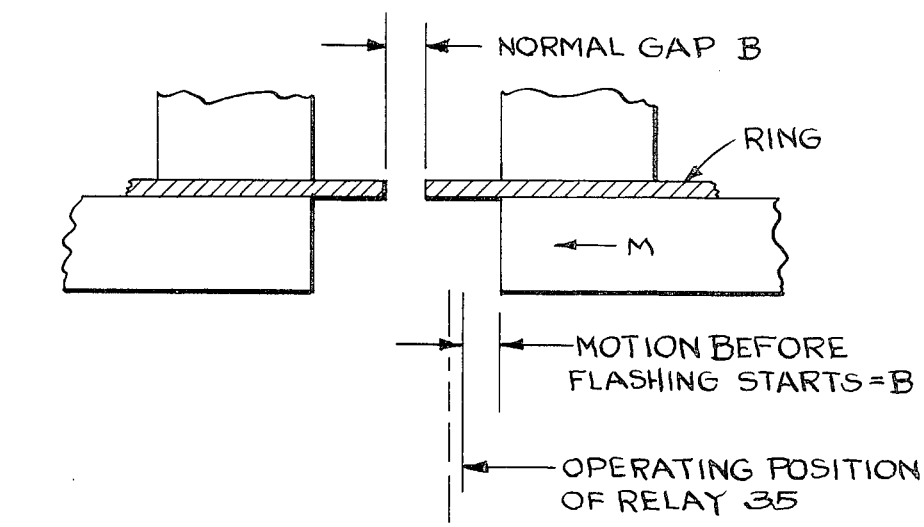
FIGS. 2a and 2b are fragmentary schematic representations with FIG. 2a showing a normal gap and FIG. 2b showing a too-large gap, these figures including representations of various control functions, FIG. 3 discloses an electrical circuit showing a presently-preferred control system to detect the start of flashing of a particular rim loaded within the flashwelder.
Figure 2B:
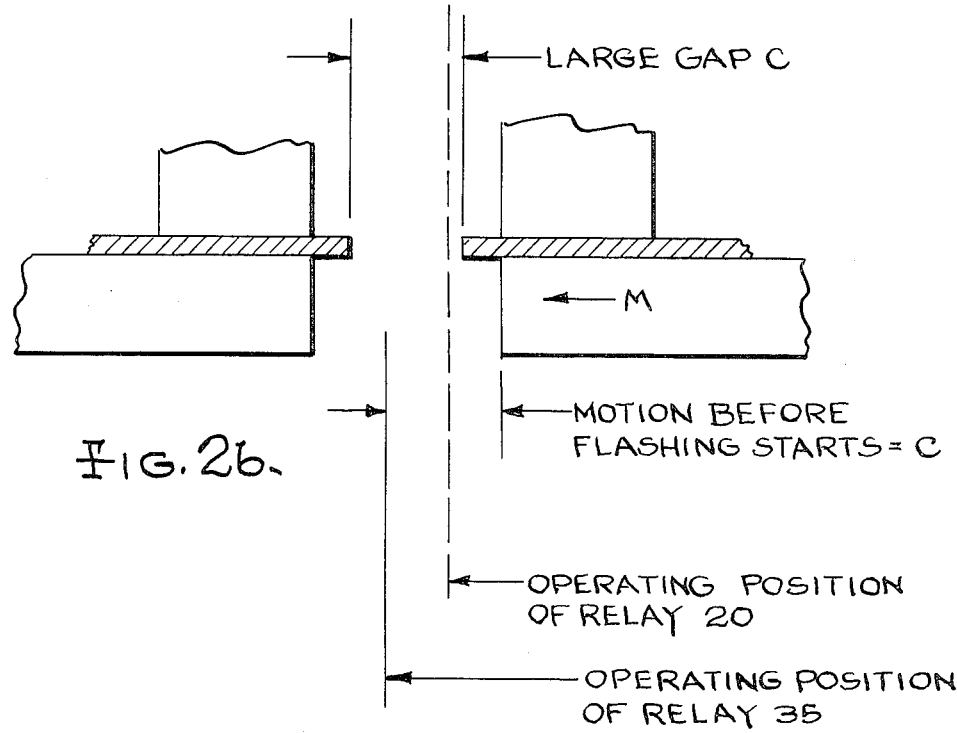

FIGS. 2a and 2b are correlated to show why a too-large gap will produce an unsatisfactory weld, and the various relay operating positions shown therein will be better understood following description of the systems for controlling operation of the relays.

Figure 3:
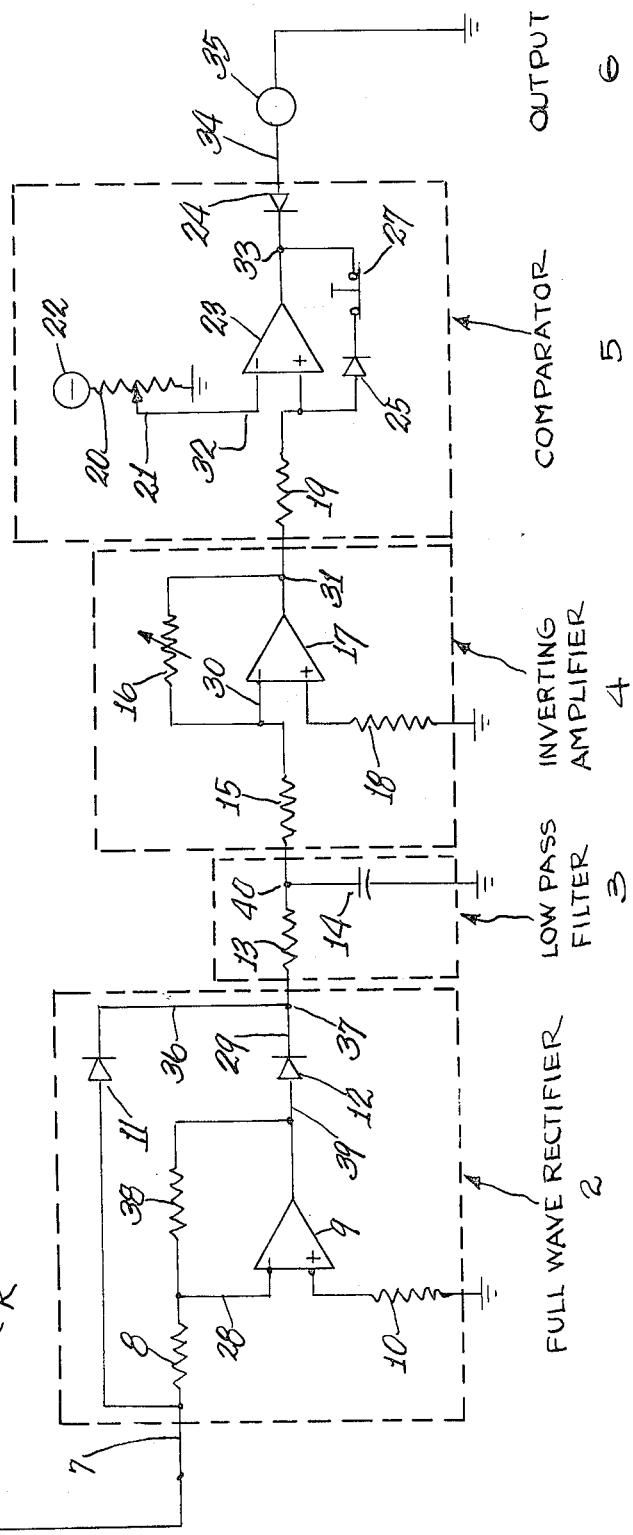

Reference is made to FIG. 3 for the control system for the relay 35 referenced in FIGS. 2a and 2b. In this control system the input signal source produces a signal which is proportional to the welding machine primary input welding current. This source may take any one of various suitable forms, such as a Hall effect device which may produce a signal proportional to either primary or secondary welding current or, as shown in FIG. 3, may be in the form of a current transformer 1.1 which is arranged to be responsive to the current flowing in the primary 1.2 of the flash welder transformer. As diagramatically shown, a metal rim is connected to the opposite ends of the secondary 1.3 of the welder transformer. The secondary current of the transformer 1.1 is converted to a voltage by means of a resistor 1.4 connected across its secondary winding.

An alternating input signal 7 emanates from the secondary of transformer 1.1 and signal 7 is full-wave rectified by rectifier 2. The rectifier herein disclosed comprises a diode 11 which passes the positive portions of signal 7 to a junction 37. Negative portions of the signal are blocked by the diode 11 but are inverted by an inverting unity gain amplifier composed of resistors 8 and 38 connected in circuit with the inverting input of an operational amplifier 9, so that positive signals 39 pass through a diode 12 to the junction 37. The noninverting input of amplifier 9 is connected to ground through a resistor 10. The full wave rectifier 2 is well-known in the art and may take any other suitable form, such as an "absolute value" type when voltage drops present a problem.

Figure 4:
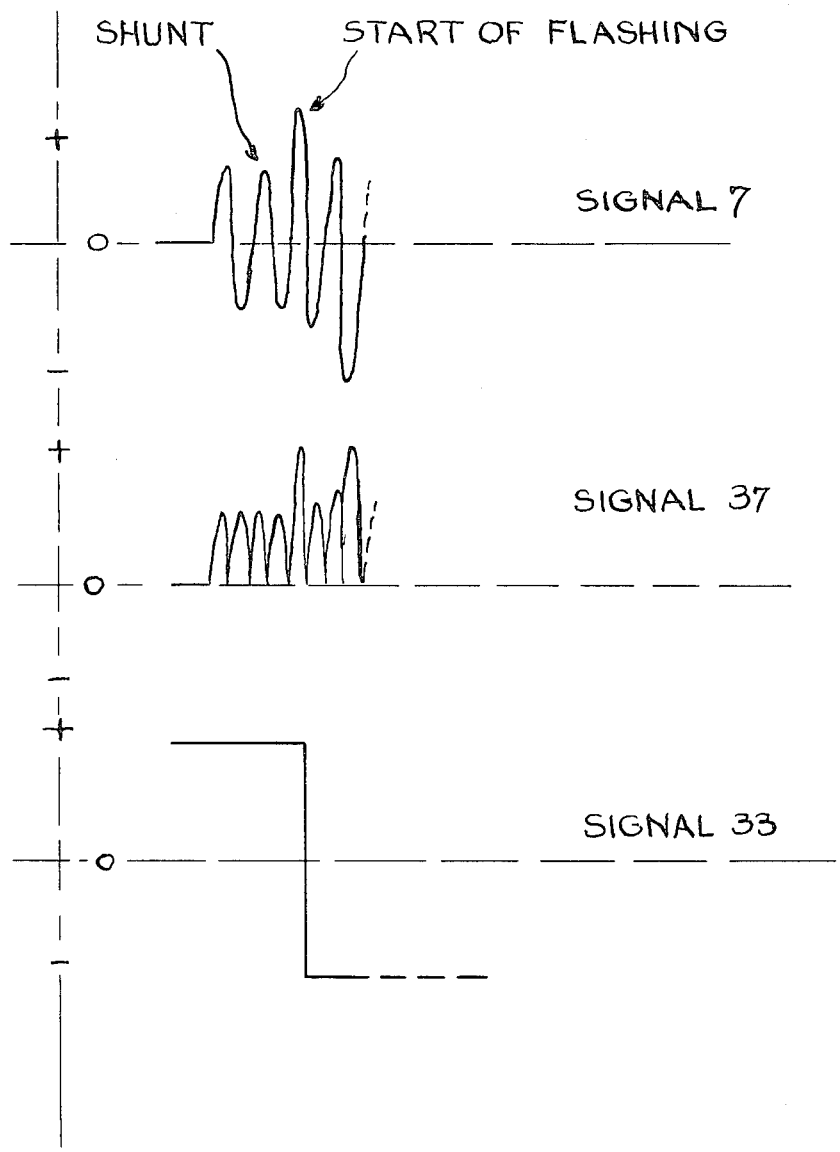
FIG. 4 shows typical comparative values of electrical signals at various parts of the circuit shown in FIG. 3, FIG. 5 discloses an electrical system for determining the position of the movable platen as it moves in the welding direction.

It will be appreciated that the signal at junction 37 is a positive rectified voltage which is proportional to signal 7, with peak values equal to signal 7 less the voltage drop of either diode 11 or 12. FIG. 4 compares the wave shape of the signals 7 and 37.

The rectified signal 37 is fed to a low-pass filter 3 which is composed of a resistor 13 and capacitor 14. Filter 3 is also well-known and is used to attenuate high frequency noise. The values of resistor 13 and capacitor may be adjusted, if necessary, to suit the characteristics of the respective welding machine in which they are installed. Other devices, such as active filters, could also be used to attenuate high-frequency noise.

The signal 40 at the output of the low-pass filter is less than the signal at junction 37 because of the drop in resistor 13, and depending upon the strength of the signal at input 7, the signal at 40 may or may not require amplification. In the event amplification is needed, the inverting amplifier 4 is provided for that purpose. The inverting amplifier 4 comprises a fixed resistor 15 and a variable resistor 16, the latter having a maximum value of resistance which is greater than that of resistor 15 and is adjusted to produce an amplified signal at 31. The inverting amplifier also comprises an operational amplifier 17 which has its inverting input 30 connected to the resistor 15. As seen, the variable resistor 16 is connected between the inverting input 30 and the output 31 of the operational amplifier 17. The noninverting input of amplifier 17 is connected to ground through a resistor 18. A noninverting amplifier may be used in place of the inverting amplifier 4, providing polarities of a comparator 5 (hereinafter described) are correspondingly changed.

Signal 31 is fed to a comparator 5 which gives a saturated negative output signal at 33 whenever the peak value of signal 31 exceeds the value of the adjustable negative comparison voltage 32.

During the welding operation there is a current path through the ring. This will be appreciated from inspection of FIG. 3 wherein the secondary 1.3 of the welder transformer is shown connected to the opposite ends of the ring R to provide a closed circuit. The current is known as "shunting current," and a signal proportional to it exists at junction 31 both before and after flashing begins. Since the presence of this signal does not indicate that flashing has started (ends of the ring touching), slider 21 of a potentiometer 20 connected to a negative source 22 is adjusted so that signal 33 from amplifier 23 is positive with the presence of shunting current only. The adjustment is further made so that an increase of about 20 percent in the shunting current signal at 31 will switch output 33 to negative. This is done so that a sudden slight surge in the power line, such as the starting of an electric motor or the like which is independent of the presently-described control circuit, does not cause switching of the comparator.

Therefore, a signal level at 31 greater than 120 percent of the shunting current value will be required to switch comparator so as to give a negative saturated output at 33, to forward bias diode 24 and energize relay 35. The signals 7, 37 and 33 are graphically shown in FIG. 4 from shunt signal to the signal at the start of flashing.

Welding tests have shown that there is a peak value current increase of at least 70 percent above that of the shunting current when the edges of the ring gap touch and flashing begins. When this takes place signal 31 exceeds signal 32 and the output of amplifier 23 switches to negative to forward bias diode 24 and energize the relay 35. Signal 33 is fed through the positive feedback composed of diode 25 and N/C (normally closed) push button contact 27. Thus, the presence of a negative signal at 33 locks amplifier 23 to a negative output to thereby keep relay 35 energized until the contacts 27 are opened.

In order to effect the control of flash welding in accordance with this invention, the energization of relay 35 is compared with a signal, or relay actuation, which occurs when the welding machine platen has moved a distance slightly greater than denoted at "B" in FIG. 2a, but less than distance denoted at "C" in FIG. 2b. The platen position signal is obtained by using a circuit such as shown in FIG. 5.

Figure 5:
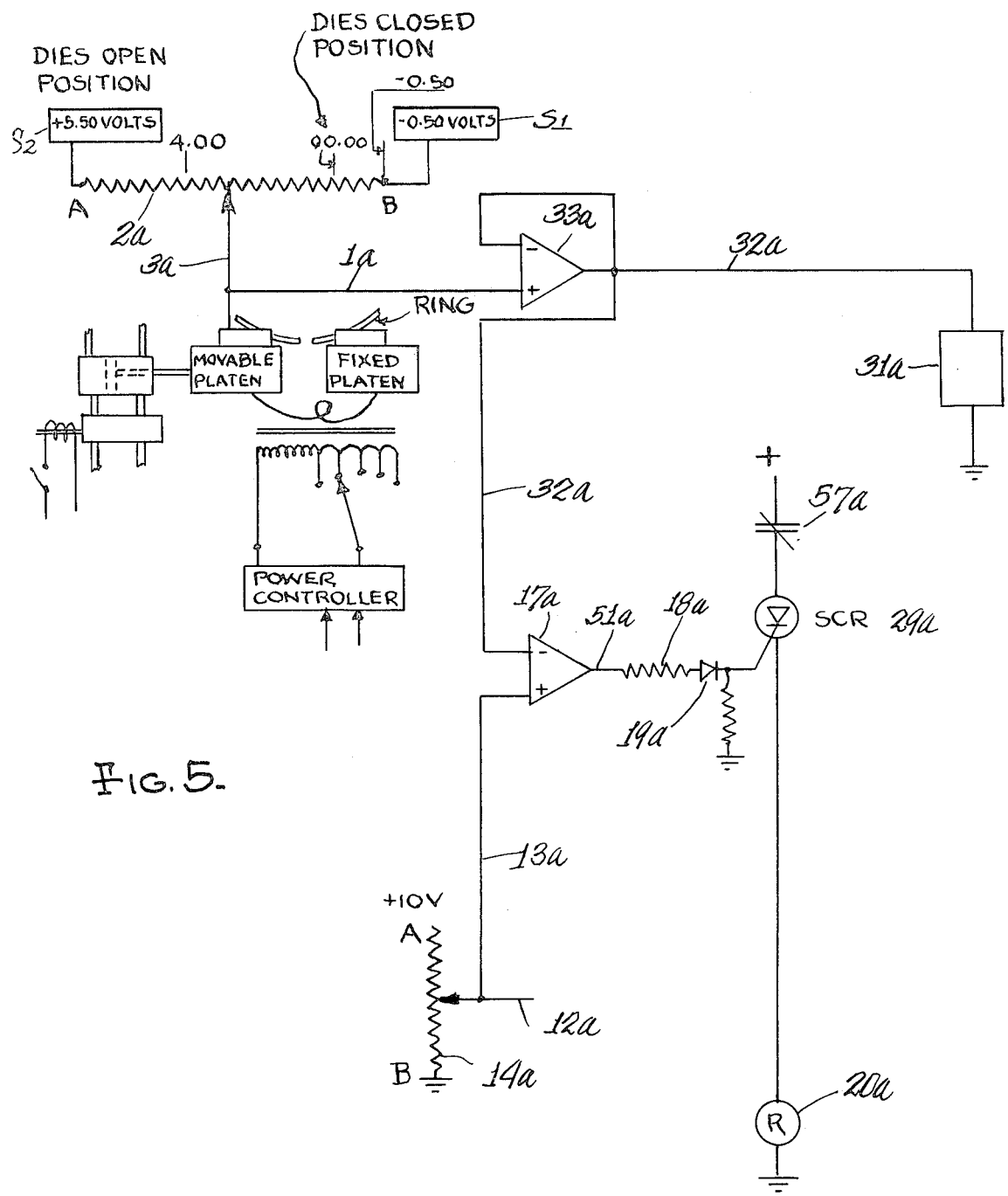

As seen in FIG. 5, the slider 3a of a linear potentiometer 2a is connected to the movable platen of the flash welder for movement therewith with the slider wiping over the resistance of the potentiometer. Source voltages are applied to the potentiometer and, in the embodiment disclosed, the algebraic sum of these voltages is equal in volts to the potentiometer's length in inches. The boxes electrically connected to the "A" and "B" terminals of the potentiometer resistance are common plus and minus voltage supplies (such as Colex Model 22-100) which in turn are regulated by precision adjustable voltage regulators (not shown). The regulator for source "S1" may be a National semiconductor Model LM 304 and for source "S2" may be a NS Model LM 305. The voltage impressed on the forward or "dies closed" end of the potentiometer (the right-hand end of FIG. 5) is made negative, and the retracted or "dies open" end of the potentiometer 2a (the left-hand end in FIG. 5) is made positive.

In the illustrated embodiment the algebraic difference of the voltages from sources "S1" and "S2" is six volts so that one volt equals one inch of length on the six-inch potentiometer. Source "S1" applies −0.50 volts to the right end of the potentiometer and source "S2" applies +5.50 volts to the left end of the potentiometer, so that the algebraic difference is six volts. It will be noted that the 00.00 point on the potentiometer 2 (representing the "dies closed" position) is located one-half inch (12.70 millimeters) inward of the right-hand end of the potentiometer.

Signal 1a from the potentiometer slider is fed to the noninverting input of an operational amplifier 33a. The output signal 32a of the amplifier 33a is connected to the input of a digital direct current volt meter 31a. Since the signal 1a has a scale of one volt per inch of platen movement and signal 32a is equal to signal 1a, the meter indication is a measure of the platen position at any time relative to the platen "dies closed" position. The meter range is selected so that it can indicate the voltage corresponding to the platen maximum "dies open" position as the slider 3a moves toward potentiometer end A. The number of meter digits is selected to give the required resolution, and in the illustrated embodiment the meter has a range of 19.99 volts, and therefore, a measurement range of 19.99 inches and a resolution of 0.01 volts or 0.01 inches. The meter may be a Weston Model 1230, and is shown as grounded in FIG. 5.

The output signal 32a from amplifier 33a is also fed to the inverting input of a comparator amplifier 17a, and the noninverting input of the latter is connected to the output 13a of a slider 12a of potentiometer 14a, the latter having its end "A" connected to a positive 10-volt source.

When signal 32a from the amplifier 33a becomes slightly less than signal 13a from slider 12a, the output of the comparator 17a becomes positive and forward biases diode 19a and in turn fires SCR 29a which energizes relay 20a. Contacts 57a open at the start of each welding sequence to unlock relay 20a. The exact means for doing this would depend on the particular logic system used with the welding machine. The initiation position is determined by the setting of the slider 12a of potentiometer 14a. For example, if the initial platen position was 4.5 inches from its closed, or zero position, and the normal gap between adjoining ends of the ring to be welded is 0.30 inches, the slider 12a of potentiometer 14a would be set to 4.00 volts, or inches. This would energize relay 20a when the platen has moved 0.50 inches, or 0.20 inches beyond the normal gap closed position.

Figure 6A:
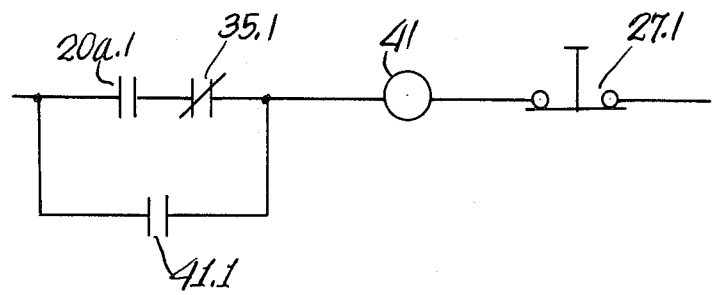
FIGS. 6a, 6b, 6c and 6d show circuit connections for various switching functions carried out in the control circuits of FIGS. 3 and 5.

FIG. 6a shows the circuit used to compare the flashing signal given by energization of relay 35 with the platen position signal given by the energization of relay 20a. Normally-closed contact 35.1 of relay 35 is in series with normally-open contact 20a.1 of relay 20a. If contact 35.1 has not opened before contact 20a.1 closes, relay 41 is energized, and this closes contact 41.1 and locks in relay 41. Contact 41.3 (FIG. 6c) is also closed when relay 41 is energized to energize signal light 40 (or any other visable or audible signal) to indicate that the gap was too large.

Figure 6B:
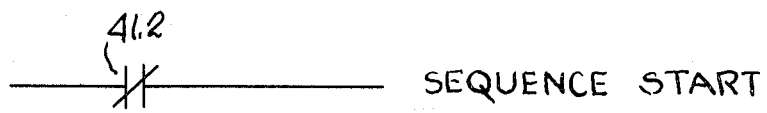
Figure 6C:
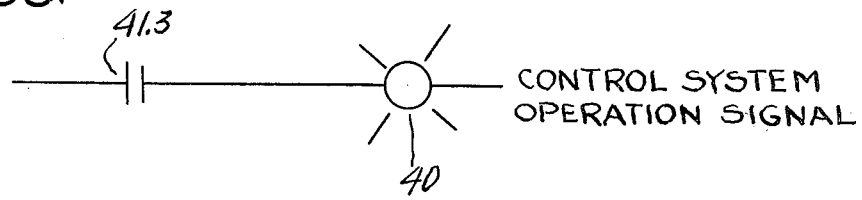
Figure 6D:
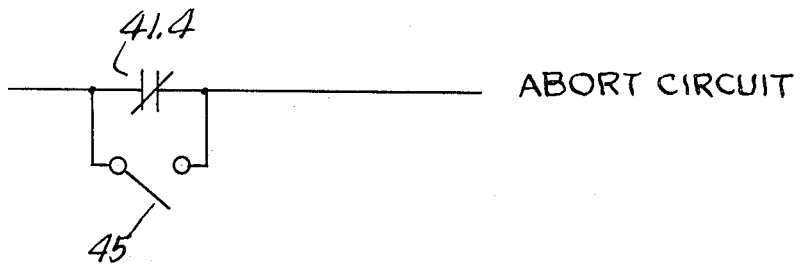

In FIG. 6d, normally-closed contact 41.4 of relay 41 is shown in parallel with a selection switch 45. If switch 45 is open, as shown, opening contact 41.4 will actuate the machine abort weld circuit. The actual connection of this abort circuit with the machine sequencing system will vary with the machine type. The abort circuit may halt platen motion, or interrupt power to the welding machine, etc. If only a fault signal is required, the switch 45 is maintained in closed position.

In the event only a signal is used, and the operator fails to observe the signal, a sequence start circuit is provided, including a closed contact 41.2 of relay 41 (FIG. 6b). This is provided so that the operator must operate the reset push button 27 with its contacts in the feedback circuit of comparator 5 (see FIG. 3) and in series with relay 41 (see FIG. 6a ) before a machine sequence can be initiated after the control system of the present invention has operated. Operator actuation of reset push button opens the contacts of switch 27 (see FIG. 3) to unlock the amplifier 23 from its negative output so that relay 35 is deenergized. Push button contacts 27.1 (FIG. 6a) are connected to switch 27 (FIG. 3) and operate with it. Opening of contacts 27.1 resets relay 41 to open contacts 41.1.

I claim:

1. The method of welding split rings in a flash welder, said rings being formed in high production manner generally with a normal gap between adjoining ends at said split rings but because of variations in material and the like, some rings being formed with larger-than-normal gaps, said flash welder having a pair of work clamps for firmly holding respective end portions of a ring with ring ends extending from said clamps in a direction toward each other with said gap between said clamps, said clamps being respectively carried by movable and stationary platens so that at the beginning of a welding cycle said ring ends may be moved toward each other and welding current applied therebetween when said movable platen has been moved toward said stationary platen an amount equal-to or slightly-greater-than said normal gap to effect a satisfactory weld between said ring ends having a normal gap, the method of accounting for rings having a larger-than-normal gap, comprising,
    establishing a first signal when said movable platen has moved a distance equal-to or slightly-greater-than is required for beginning of flashing between ring ends with a normal gap,
    establishing a second signal at a position of the movable platen when flashing actually begins between the ring ends, and
    effecting operation of control means when said second signal is established a predetermined time after said first signal.

2. The method according to claim 1, wherein said control means effects operation of a signal to advise the machine operator that the gap in the ring being welded is too large.

3. The method according to claim 1, wherein said control means aborts the welding operation.

4. The method according to claim 2 and further preventing a successive welding cycle without resetting the welding machine.

5. A flash welder for welding split rings, said welder having a pair of work clamps for clamping respective end portions of a ring with ends of the ring extending therefrom toward each other, said rings being formed and loaded into and ejected from said flash welder in high production manner, the majority of said rings being formed with a normal gap between the ends thereof but because of variations some may have a larger-than-normal gap between said ends, said welding machine having movable and stationary platens respectively carrying said work clamps, said platens at the start of a welding cycle being spaced to accomodate the normal gap of ring ends and said movable platen being movable toward said stationary platen an amount equal-to or slightly-larger-than said normal gap to begin flashing between ring ends spaced a normal work gap and by burning off material at said ring portions to create welding heat sufficient to fusibly join said ring ends when the same are abruptly forced against each other during upset operation of said welder, the improvement for accounting for rings having a larger-than-normal gap, comprising,
    first means establishing a first signal when said movable platen has moved a distance equal to or slightly more than is required for beginning flashing between ring ends with a normal gap,
    second means establishing a second signal at the position of the movable platen when flashing between said ends actually begins, and operable means actuated when said second signal is established a predetermined time after said first signal.

6. The construction according to claim 5 and further including a signal actuated by said operable means to advise the machine operator that the gap in the ring being welded is too large.

7. The construction according to claim 5 wherein said operable means is adapted to abort the welding operation.

8. The construction according to claim 6 wherein said welding machine has a resettable sequence start circuit which is opened by actuation of said operable means to prevent a successive welding cycle without resetting of said sequence start circuit.

9. The construction according to claim 5 wherein said first means includes a linear potentiometer having a stationary resistance and a slider movable over said resistance, said slider being connected to said movable platen to move in unison therewith and thereby provide a signal which varies in accordance with the position of said movable platen.

10. The construction according to claim 9 and including a second potentiometer having a resistance and a slider adjustable to various positions therealong, the slider of said second potentiometer being operator-adjustable to provide a selected signal that is compared with the signal from said first-named potentiometer to determine the distance said movable platen moves for a selected size ring gap.

11. The construction according to claim 10 wherein a relay is energized when said movable platen has moved the distance for a selected size ring gap, said relay controlling switch contacts to provide the signal of said second means.

12. The construction according to claim 5 wherein said second means is affected by voltage proportional to the welding machine primary input welding current.

13. The construction according to claim 12 wherein the ring to be welded has its split ends connected to the secondary of the welding machine transformer to place said ring in series with said secondary so that a shunting current passes through the ring, said second means being operated by an increase of current in an amount materially over that of said shunting current, said increase being caused by abutment of and flashing between opposite ends of said split ring.

14. The construction according to claim 13 wherein a relay is energized when said current is materially increased.

15. The construction according to claims 11 and 14, wherein a normally-open contact of the relay energized by predetermined movement of said movable platen is disposed in series with a normally-closed contact of the relay energized by increase over shunting current, whereby if the normally-closed contacts are not opened before normally-open contacts are closed, a further relay is energized to control contacts to selectively abort the weld circuit or to energize a signal, or both.

* * * * *